United States Patent [19]

Beard

[11] Patent Number: 4,606,090

[45] Date of Patent: Aug. 19, 1986

[54] AUXILIARY LOADING DOCK RAMP

[75] Inventor: Robert J. Beard, Indianapolis, Ind.

[73] Assignee: Woodford Manufacturing Company, Colorado Springs, Colo.

[21] Appl. No.: 618,878

[22] Filed: Jun. 8, 1984

[51] Int. Cl.⁴ ............................................. E01D 15/00
[52] U.S. Cl. .................................................... 14/72.5
[58] Field of Search ...................... 14/69.5, 71.1, 72.5

[56] References Cited

U.S. PATENT DOCUMENTS

| | | | |
|---|---|---|---|
| 1,210,133 | 12/1916 | Baker | 14/69.5 |
| 1,329,924 | 2/1920 | Paul | 14/71.1 X |
| 2,436,467 | 2/1948 | Winter | 14/71.1 X |
| 2,779,958 | 2/1957 | Hodges et al. | 14/69.5 |
| 4,043,288 | 8/1977 | Vulovic | 14/71.1 X |
| 4,087,876 | 5/1978 | Fillman et al. | 14/72.5 |

FOREIGN PATENT DOCUMENTS

| | | | |
|---|---|---|---|
| 695684 | 10/1964 | Canada | 14/69.5 |
| 710989 | 6/1965 | Canada | 14/72.5 |
| 1007698 | 5/1957 | Fed. Rep. of Germany | 14/72.5 |
| 2446216 | 9/1980 | France | 14/69.5 |
| 1304689 | 1/1973 | United Kingdom | 14/71.1 |

Primary Examiner—James A. Leppink
Assistant Examiner—John F. Letchford
Attorney, Agent, or Firm—Zarley, McKee, Thomte, Voorhees & Sease

[57] ABSTRACT

An auxiliary loading dock ramp is provided which can be securely locked to a conventional ramp so as to increase the overall length of the ramp surfaces thereby lessening the degree of incline of the ramps between a loading dock and a truck or railroad car. The auxiliary loading dock ramp includes legs on the forward end thereof and support means on the rearward end thereof to maintain the ramp in an elevated position above the surface of the loading dock, and channel members on the underside of the deck of the ramp to receive the forks of a pallet jack employed in moving the auxiliary ramp into position. A pair of ears on each side of the auxiliary ramp adjacent the rearward end thereof are received in slots in the forward end of a conventional ramp such that the forward end of the conventional ramp overlappingly engages the rearward end of the auxiliary ramp to provide an elongated deck surface over which loads may be transported between the loading dock and the truck or railroad car.

5 Claims, 8 Drawing Figures

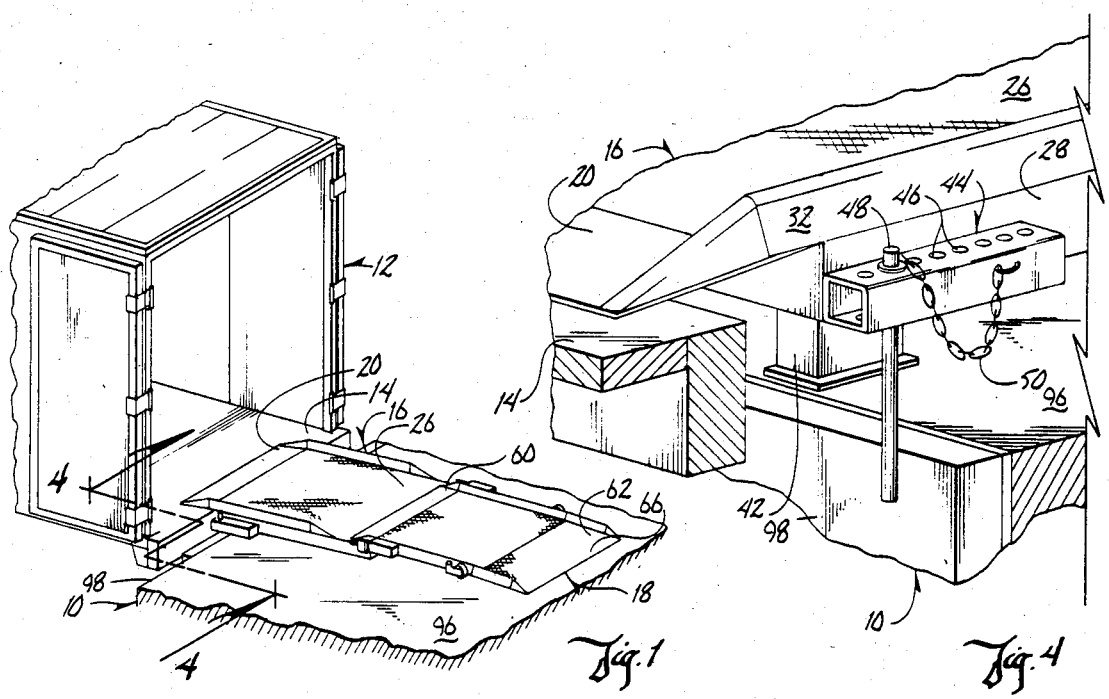

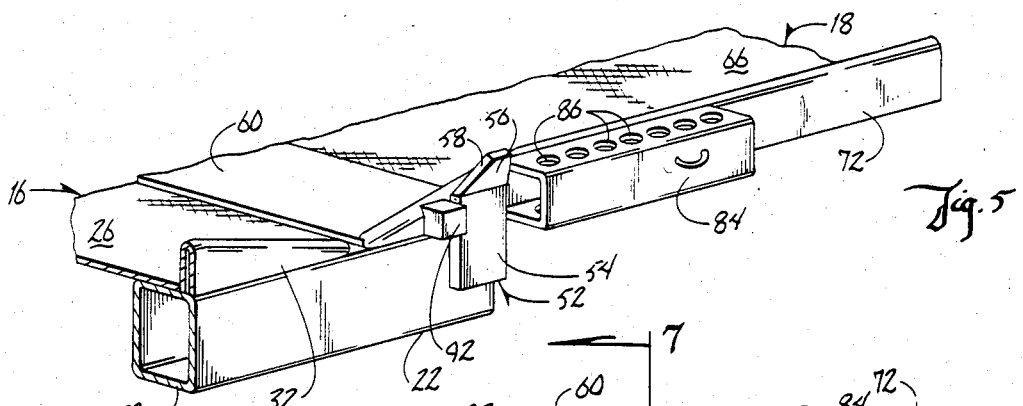
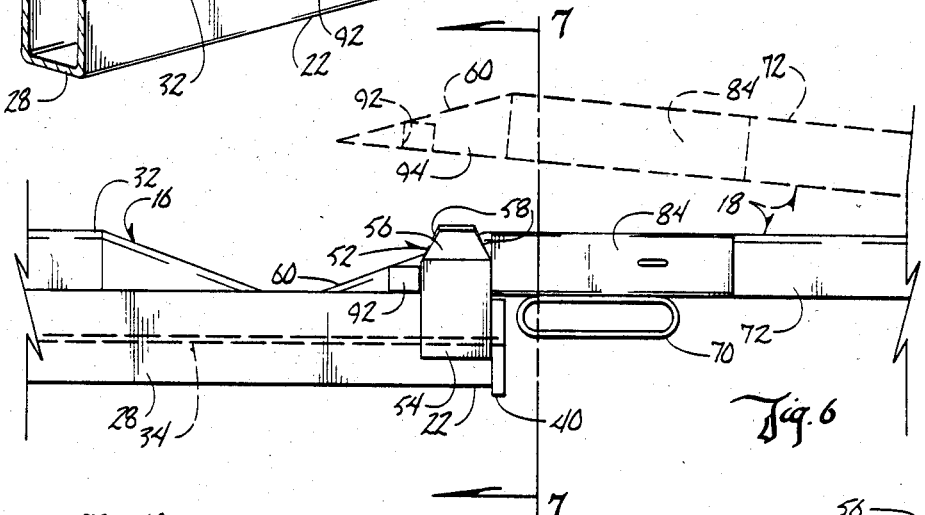
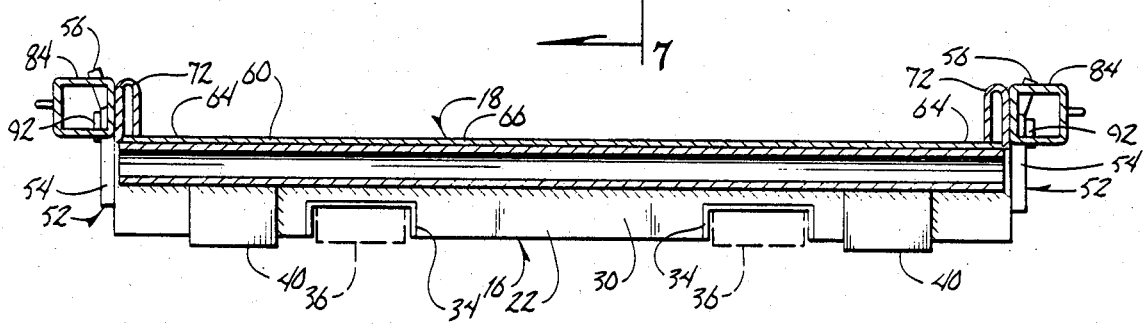
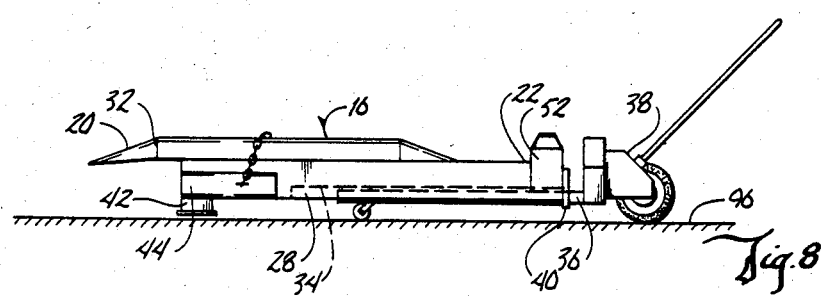

4,606,090

AUXILIARY LOADING DOCK RAMP

BACKGROUND OF THE INVENTION

Loading dock ramps or dock plates are commonly used to bridge the gap between a truck or railroad car and an adjacent loading dock which typically is at a different elevation than the floor of the truck or railroad car. Such ramps allow various wheel devices, such as fork lifts or pallet lifts, to be utilized in the loading and unloading of the truck or railroad car. However, substantial height differences between the floor of the truck or railroad car and the loading dock often create problems in such loading and unloading. For example, the frame of the wheeled vehicle can become caught on a steeply inclined ramp when one set of wheels is on the ramp and the other set of wheels is off the ramp. Also, loads extending beyond the front wheels of the vehicle can be caught on the ramp due to the inability to raise the load a sufficient height above the ramp. In addition, some loading trucks carrying a heavy load cannot proceed up a steeply inclined ramp.

Therefore, a primary objective of the present invention is the provision of an elongated dock ramp which overcomes the problems associated with extreme height differentials at opposite ends of the ramp.

A further objective of the present invention is the provision of an auxiliary loading dock ramp which can be secured to a conventional ramp so as to increase the overall length of the combined ramps and thereby decrease the angle of inclination from one end to the other.

Another objective of the present invention is the provision of an auxiliary loading dock ramp which is portable, yet can be securely locked into place during use.

A further objective of the present invention is the provision of a portable loading dock ramp which is easy to maneuver into position and which is safe and durable in use.

These and other objectives will be apparent from the description of the dock ramp of the present invention.

SUMMARY OF THE INVENTION

An auxiliary loading dock ramp is provided which can be secured to a conventional dock ramp such that the overall length of the combined ramps is greater than that of an individual ramp, thus decreasing the angle of inclination of the ramps as they are positioned for use between a loading dock and a truck or railroad car. The auxiliary loading dock ramp includes a deck portion with opposite ends and opposite sides with a pair of channels on the underside of the deck which are adapted to receive the forks of a pallet jack used in moving the auxiliary ramp into a desired position. A pair of legs on the first end of the deck portion and a support means on the second end of the deck portion elevate the deck portion such that the pallet jack can be positioned beneath the deck portion. A locking means is included on the second end of the deck portion and is adapted to secure the deck portion to a second conventional ramp. Additional anchor means holds the connected ramps in position during use and prevents the ramps from sliding downwardly off of the elevated truck trailer, railroad car or loading dock.

BRIEF DESCRIPTION OF THE DRAWINGS

FIG. 1 is a perspective view of the auxiliary loading dock ramp as attached to a conventional ramp with the ramps being positioned for use between a truck trailer and a loading dock.

FIG. 2 is a side elevational view of the combined ramps in position for use.

FIG. 3 is a top plan view of the connected ramps positioned for use.

FIG. 4 is a perspective view taken along line 4—4 of FIG. 1.

FIG. 5 is an enlarged sectional perspective view showing the interlocking mechanism which secures the auxiliary loading dock ramp to the conventional ramp.

FIG. 6 is a side elevational view of the locking mechanism.

FIG. 7 is a view taken along line 7—7 of FIG. 6.

FIG. 8 is a side elevational view showing a pallet jack positioned beneath the auxiliary loading dock ramp for movement of the ramp.

DETAILED DESCRIPTION OF THE PREFERRED EMBODIMENT

Referring to the drawings, the numeral 10 generally designates a conventional, horizontal loading dock. A conventional truck 12 is shown to be parked in loading condition adjacent to dock. A standard railroad car can also be positioned adjacent the dock in place of truck 12. The numeral 14 generally designates the truck bed onto which goods are to be loaded and from which goods are to be unloaded.

An auxiliary loading dock ramp 16 is joined with a conventional ramp or dock plate 18 so as to bridge the gap between truck 12 and loading dock 10 and so as to provide an incline surface from truck 12 to loading dock 10. Both ramps 16 and 18 are of steel construction. In the figures, truck bed 14 is shown to be at a higher elevation than loading dock 10.

Auxiliary ramp 16 has a forward end 20, a rearward end 22, and opposite sides 24. Auxiliary ramp 16 includes an upper deck 26 secured to side support rails 28 with crossbars 30 extending between side rails 28 and beneath deck 26 for support thereof (FIG. 7). A safety curb 32 extends along the length of each side 24 of ramp 16. Crossbars 30 each have recessed portions therein into which a channel member 34 is fit and secured by welding or the like. Channel members 34 are spaced apart so as to receive elongated prongs or forks 36 of a pallet jack 38 such that auxiliary ramp 16 may be moved as needed. A pair of support members 40 mounted adjacent rearward end 22 of auxiliary ramp 16 elevate the rearward end thereof to facilitate the positioning of pallet jack 38 beneath ramp 16.

Forward end 20 of ramp 16 includes a pair of downwardly extending legs 42 which elevate the forward end above loading dock 10 (FIG. 4). Brackets 44 are secured to the outside surfaces of side rails 28 adjacent forward end 20 of ramp 16. Apertures 46 extend through bracket set 44 and are adapted to receive an anchoring pin 48 which is connected to brackets 44 by a chain 50. Pin 48 can be inserted into the appropriate aperture 46 in bracket 44 to lock ramp 16 against sliding movement along loading dock 10, as further described hereinafter.

A pair of ears 52 are mounted on each side 24 of auxiliary ramp 16 adjacent rearward end 22 thereof (FIGS. 5 and 6). Ears 52 are securely attached to the outside surfaces of side rails 28 so as to extend upwardly from deck 26. Each ear includes a vertically disposed base portion 54 connected to side rail 28 and an integrally formed tip portion 56 angled outwardly away from deck 26. The edges 58 of tip portion 56 are tapered from bottom to top.

Ramp 18 is a conventional ramp such as that disclosed in U.S. Pat. No. 4,087,876. Ramp 18 has a forward end 60, a rearward end 62, and opposite sides 64. Ramp 18 includes a deck 66 mounted upon crossbar supports 70. Safety curbs 72 extend along each side 64 of ramp 18. An axle 74 extends beneath deck 66 and across the width thereof to pivotally support wheel assembly 76 which is used in moving ramp 18 into its operative position. A sleeve 78 is attached to wheel assemblies 76 and is adapted to receive a lever arm (not shown) for pivoting wheel assembly 76 about axle 74 such that ramp 18 can be raised for movement upon wheels 80. A shock absorber 82 is operably connected to wheel assembly 76 to dampen and retard the rotation of wheel assembly 76 about axle 74.

Brackets 84 having apertures 86 therein are secured to the sides 64 of ramp 18 adjacent forward end 60 thereof. An anchoring pin 88 is connected to brackets 84 by a chain 90 and is adapted to fit into one of apertures 86 so as to lock ramp 18 against sliding movement upon loading dock 10 when ramp 18 is used without auxiliary ramp 16 attached thereto. A finger or stub 92 is connected to each side 64 of ramp 18 and extends outwardly therefrom. Stubs 92 are forwardly spaced apart from anchor brackets 84 so as to define a space or slot 94 between stubs 92 and brackets 84 for receiving ears 52 on auxiliary ramp 16.

To interconnect ramps 16 and 18 for use in loading or unloading a truck 12 or railroad car positioned adjacent loading dock 10, auxiliary ramp 16 is first moved into position by pallet jack 38 or other convenient means such that forward end 20 of ramp 16 overlappingly engages truck bed 14 (or the railroad car floor). Support members 40 at rearward end 22 of auxiliary ramp 16 rest upon the upper surface of loading dock 10 such that deck 26 is elevated above the horizontal support surface 96 of loading dock 10. Pin 48 is inserted through the appropriate aperture 46 of anchor bracket 44 so as to engage the front edge 98 of loading dock 10 and thereby prevent rearward sliding movement of auxiliary ramp 16 upon loading dock 10, as seen in FIG. 2. As best seen in FIG. 2, legs 42 of auxiliary ramp 16 do not engage upper surface 96 of loading dock 10 when auxiliary ramp 16 is positioned for use. Forward end 20 of auxiliary ramp 16 is raised to the elevation of truck bed 14 by raising forks 36 of pallet jack 38 in the conventional manner. A conventional pallet jack 38 cannot raise a conventional dock plate 18 high enough to negotiate the difference in elevation between some docks and some vehicles. However, since the forward end 20 of auxiliary ramp 16 is already held in an initial elevated position by legs 42, the additional lifting of the pallet jack enables ramp 16 to bridge greater height differentials between docks and vehicles than does a conventional ramp 18.

After auxiliary ramp 16 is in place and pallet jack 38 has been removed therefrom, ramp 18 is rolled into position upon wheels 80. Ramp 18 is moved towards auxiliary ramps 16 until forward end 60 of ramp 18 is over rearward end 22 of auxiliary ramp 16 and space 94 is approximately aligned with ears 52. Ramp 18 is then lowered by pivoting wheel assembly 76 about axle 74 through use of the lever arm (not shown) such that the opposite sides 64 of ramp 18 are positioned between ears 52 on auxiliary ramp 16 and such that ears 52 are received in space 94 between stubs 92 and anchor brackets 84 of ramp 18. The outwardly disposed tip portions 56 of ears 52 facilitate the positioning of ramp 18 therebetween with tapered edges 58 of tip portions 56 aiding the alignment of ears 52 within spaces 94. When ramp 18 is completely lowered, forward end 60 thereof overlappingly engages rearward end 22 of auxiliary ramp 16 such that decks 66 and 26 provide a substantially smooth inclined surface over which a load can be transported between loading dock 10 and truck 12.

While only two interconnected ramps 16 and 18 have been shown, additional ramps similar to ramp 16 could be joined in groups of more than two to accommodate extreme loading conditions.

Interconnected ramps 16 and 18 provide an elongated surface from truck 12 to loading dock 10 with a substantially smaller degree of incline than a single conventional ramp or dock plate used alone. Such a lengthened ramp with a less steep inclined surface permits more efficient loading and unloading of the truck by allowing the use of conventional fork lifts and pallet jacks which could not otherwise be utilized on a steeply inclined single ramp.

What is claimed is:

1. A loading dock ramp, comprising:
   first and second deck portions each having forward and rearward ends and opposite sides;
   coupling means on the rearward end of said first deck portion and on the forward end of said second deck portion for detachably securing said deck portions together in an overlapping relationship so as to provide an elongated continuous surface over which a load is movable;
   said coupling means including an ear attached to each side of said first deck portion adjacent the second end thereof and extending upwardly therefrom, and a recess means on each side of said rearward deck portion for matingly receiving said ears thereby securing said first and second deck portions adjacent the forward end thereof together;
   each of said ears terminating in an angularly disposed tip extending upwardly and outwardly with respect to said first deck portion so as to guide said second deck portion into position with respect to said first deck portion.

2. The ramp of claim 1 wherein said first deck portion includes channel means on the underside thereof for receiving the elongated forks of a pallet jack for lifting said first deck portion to an elevated position.

3. The ramp of claim 1 wherein said second deck portion includes wheel means pivotally secured thereto for moving said second deck portion from one location to another.

4. The ramp of claim 1 wherein said first deck portion includes a leg means secured to the forward end thereof to hold said first end in an elevated position on a horizontal support surface.

5. The ramp of claim 1 wherein said first deck portion includes support means on the rearward end thereof to maintain said first deck portion in an elevated position on a horizontal support surface.

* * * * *